(12) United States Patent
Kuroki et al.

(10) Patent No.: US 9,267,448 B2
(45) Date of Patent: Feb. 23, 2016

(54) VEHICLE TRAVEL CONTROL DEVICE

(71) Applicants: Rentaro Kuroki, Susono (JP); Takuya Hirai, Susono (JP); Masaki Mitsuyasu, Kawasaki (JP); Jonggap Kim, Hadano (JP); Masaki Matsunaga, Odawara (JP); Yasunari Kido, Hadano (JP); Takeaki Suzuki, Susono (JP); Takayuki Kogure, Susono (JP); Yukari Okamura, Gotenba (JP); Akihiro Sato, Nagoya (JP); Yusuke Kinoshita, Toyota (JP)

(72) Inventors: Rentaro Kuroki, Susono (JP); Takuya Hirai, Susono (JP); Masaki Mitsuyasu, Kawasaki (JP); Jonggap Kim, Hadano (JP); Masaki Matsunaga, Odawara (JP); Yasunari Kido, Hadano (JP); Takeaki Suzuki, Susono (JP); Takayuki Kogure, Susono (JP); Yukari Okamura, Gotenba (JP); Akihiro Sato, Nagoya (JP); Yusuke Kinoshita, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/439,289
(22) PCT Filed: Oct. 31, 2012
(86) PCT No.: PCT/JP2012/078224
§ 371 (c)(1),
(2) Date: Apr. 29, 2015
(87) PCT Pub. No.: WO2014/068716
PCT Pub. Date: May 8, 2014

(65) Prior Publication Data
US 2015/0300274 A1    Oct. 22, 2015

(51) Int. Cl.
*G06F 19/00* (2011.01)
*F02D 29/02* (2006.01)
(Continued)

(52) U.S. Cl.
CPC .............. *F02D 29/02* (2013.01); *F02D 29/00* (2013.01); *F02D 41/0087* (2013.01);
(Continued)

(58) Field of Classification Search
CPC .. F02D 29/02; F02D 41/0087; F02D 41/3863; F02D 29/00; F02D 41/23; F02D 2250/31; F02D 2041/0012
See application file for complete search history.

(56) References Cited

U.S. PATENT DOCUMENTS

| | | | |
|---|---|---|---|
| 2009/0093943 A1* | 4/2009 | Hirowatari | F02D 41/3836 701/103 |
| 2013/0096761 A1* | 4/2013 | Kuroda | B60K 6/48 701/22 |
| 2013/0297112 A1* | 11/2013 | Gibson | B60W 20/50 701/22 |
| 2014/0229047 A1* | 8/2014 | Kees | F02D 41/3005 701/22 |
| 2015/0120154 A1* | 4/2015 | Masunaga | B60W 10/04 701/54 |

(Continued)

FOREIGN PATENT DOCUMENTS

JP    2002 227885    8/2002
JP    2012 219904    11/2012

OTHER PUBLICATIONS

International Search Report Issued Nov. 27, 2012 in PCT/JP12/078224 Filed Oct. 31, 2012.

*Primary Examiner* — David J Hlavka
(74) *Attorney, Agent, or Firm* — Oblon, McClelland, Maier & Neustadt, L.L.P.

(57) ABSTRACT

A running control device of a vehicle includes an engine with a plurality of cylinders, a clutch connecting/disconnecting a power transmission path between the engine and wheels, a fuel pump transferring fuel toward an injector, and a fuel pressure control device controlling a fuel pressure in a transfer path of the fuel. The running control device of a vehicle performs a neutral inertia running mode performed with the power transmission path between the engine and the wheels disconnected, and a cylinder resting inertia running mode performed by resting at least a part of the cylinders of the engine with the power transmission path between the engine and the wheels connected, the fuel pressure during the neutral inertia running mode being made higher than the fuel pressure during the cylinder resting inertia running mode.

1 Claim, 4 Drawing Sheets

(51) Int. Cl.
*F02D 41/00* (2006.01)
*F02D 41/12* (2006.01)
*F02D 41/38* (2006.01)
*F02D 29/00* (2006.01)

(52) U.S. Cl.
CPC ........... *F02D 41/12* (2013.01); *F02D 41/3863* (2013.01); *F02D 41/123* (2013.01); *F02D 2041/0012* (2013.01); *F02D 2250/31* (2013.01)

(56) References Cited

U.S. PATENT DOCUMENTS

2015/0266480 A1* 9/2015 Kuroki ................. F02D 41/045 477/174
2015/0274166 A1* 10/2015 Hirai ....................... F02D 29/02 701/67
2015/0291171 A1* 10/2015 Kuroki ................... F02D 41/12 701/70

* cited by examiner

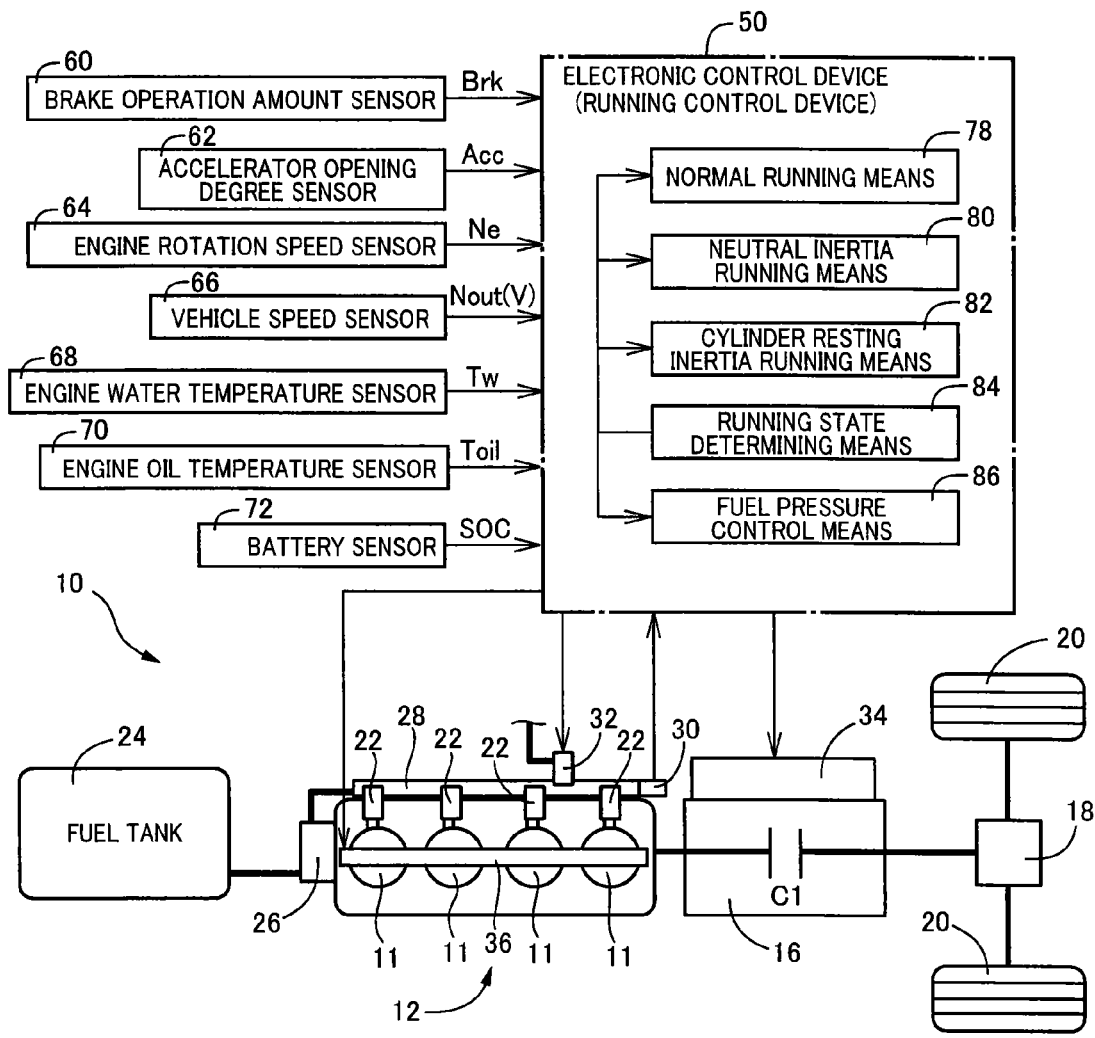

VEHICLE TRAVEL CONTROL DEVICE

TECHNICAL FIELD

The present invention relates to a running control device of a vehicle and particularly to a technique of satisfying both a fuel consumption improvement during an inertia running mode and a response improvement in reacceleration at the time of return from the inertia running mode to a normal running mode.

BACKGROUND ART

With regard to the conventional engine brake running mode performed with engine brake applied by driven rotation of an engine while a power transmission path between the engine and wheels is kept connected, to execute an inertia running mode performed with an engine brake force made lower than that of the engine brake running mode is conceived for extending a running distance and contributing to improvement in fuel consumption. A device described in Patent Document 1 is an example thereof and a control device is described that performs, for example, a neutral inertia running mode performed with a power transmission path disconnected between an engine and wheels, thereby eliminating the engine brake so as to extend a running distance and contribute to improvement in fuel consumption. Although not depicted in Patent Document 1, another known method of reducing an engine brake force to extend a running distance and contribute to improvement in fuel consumption is a cylinder resting inertia running mode performed by resting at least a part of cylinders of the engine while the power transmission path is kept connected between the engine and the wheels. Resting a part of the cylinders in this way reduces a pumping loss generated during driven rotation of pistons, resulting in a reduced engine brake force.

PRIOR ART DOCUMENT

Patent Document

Patent Document 1: Japanese Laid-Open Patent Publication No. 2002-227885

SUMMARY OF THE INVENTION

Problem to be Solved by the Invention

Although both the neutral inertia running mode and the cylinder resting inertia running mode can extend an inertia running distance to achieve a fuel consumption improvement, these types of inertia running mode have completely different power transmission states between an engine and wheels and operation states of the engine, and a vehicle may be designed that can perform these types of inertia running mode and that selectively uses these types of inertia running mode depending on a running state of the vehicle to further improve the fuel consumption. However, no conventional technique has description about a fuel pressure during the inertia running mode based on a difference between these types of inertia running mode. Therefore, two types of the inertia running mode may be performed at the same fuel pressure, which possibly leads to a reduction in fuel consumption improving effect from the inertia running mode or a deterioration in response in reacceleration at the time of termination of the inertia running mode for returning to the normal running mode, depending on a vehicle state during the inertia running mode. For example, since the cylinder resting inertia running mode is the inertia running mode performed while the power transmission path between the wheels and the engine is coupled, the engine is passively rotated by a driven torque from the wheels. As a result, a fuel pump is driven that is coupled to a rotation shaft of the engine. While the fuel pressure of the engine is high, a workload for driving the fuel pump becomes larger and a resistance during the inertia running mode increases. As a result, the inertia running distance is shortened and the fuel consumption improving effect from the inertia running mode is reduced. On the other hand, since the power transmission path between the wheels and the engine is disconnected in the neutral inertia running mode, the fuel pressure of the engine has a smaller effect on the inertia running distance. However, in the case of the neutral inertia running mode, an engine rotation speed must be increased to (synchronized with) a synchronous rotation speed corresponding to a rotation speed of the wheels for engaging a clutch at the time of termination of the inertia running mode for returning to the normal running mode. If the fuel pressure of the engine is low in this case, a time is relatively required for increasing the engine rotation speed to the synchronous rotation speed, resulting in a deterioration in response at the time of return from the inertia running mode to the normal running mode for reacceleration.

The present invention was conceived in view of the situations and it is therefore an object of the present invention to provide a running control device of a vehicle capable of satisfying both a fuel consumption improvement during an inertia running mode and a response improvement in reacceleration at the time of return from the inertia running mode to a normal running mode.

Means for Solving the Problem

To achieve the object, the first aspect of the invention provides a running control device of a vehicle including (a) an engine with a plurality of cylinders, a clutch connecting/disconnecting a power transmission path between the engine and wheels, a fuel pump transferring fuel toward an injector, and a fuel pressure control device controlling a fuel pressure in a transfer path of the fuel, the running control device of a vehicle performing a neutral inertia running mode performed with the power transmission path between the engine and the wheels disconnected, and a cylinder resting inertia running mode performed by resting at least a part of the cylinders of the engine with the power transmission path between the engine and the wheels connected, (b) the fuel pressure during the neutral inertia running mode being made higher than the fuel pressure during the cylinder resting inertia running mode.

Effects of the Invention

Consequently, the fuel pressure of the engine becomes higher during the neutral inertia running mode as compared to the cylinder resting inertia running mode. Therefore, the fuel injection can performed at the high fuel pressure and the engine rotation speed can promptly be increased at the time of return from the neutral inertia running mode to the normal running mode. Thus, the clutch connecting/disconnecting the power transmission path between the engine and the wheels can promptly be synchronized and engaged and a favorable response in reacceleration can be obtained. The fuel pressure of the engine becomes lower during the cylinder resting inertia running mode as compared to during the neutral inertia running mode. Therefore, the workload of the fuel pump during the cylinder resting inertia running mode becomes smaller and the inertia running distance becomes longer so that the fuel consumption effect from the inertia running mode can be increased. Since the engine and the wheels are coupled via the clutch in the cylinder resting inertia running mode, the engine rotation speed is high and the reacceleration can promptly be achieved even though the fuel pressure is low.

BRIEF DESCRIPTION OF THE DRAWINGS

FIG. 1 is a schematic configuration diagram including a schematic of a vehicle drive device to which the present invention is preferably applied along with a main portion of a control system.

FIG. 2 is a table for explaining three running modes performed by the vehicle drive device of FIG. 1.

MODE FOR CARRYING OUT THE INVENTION

Figure 3:
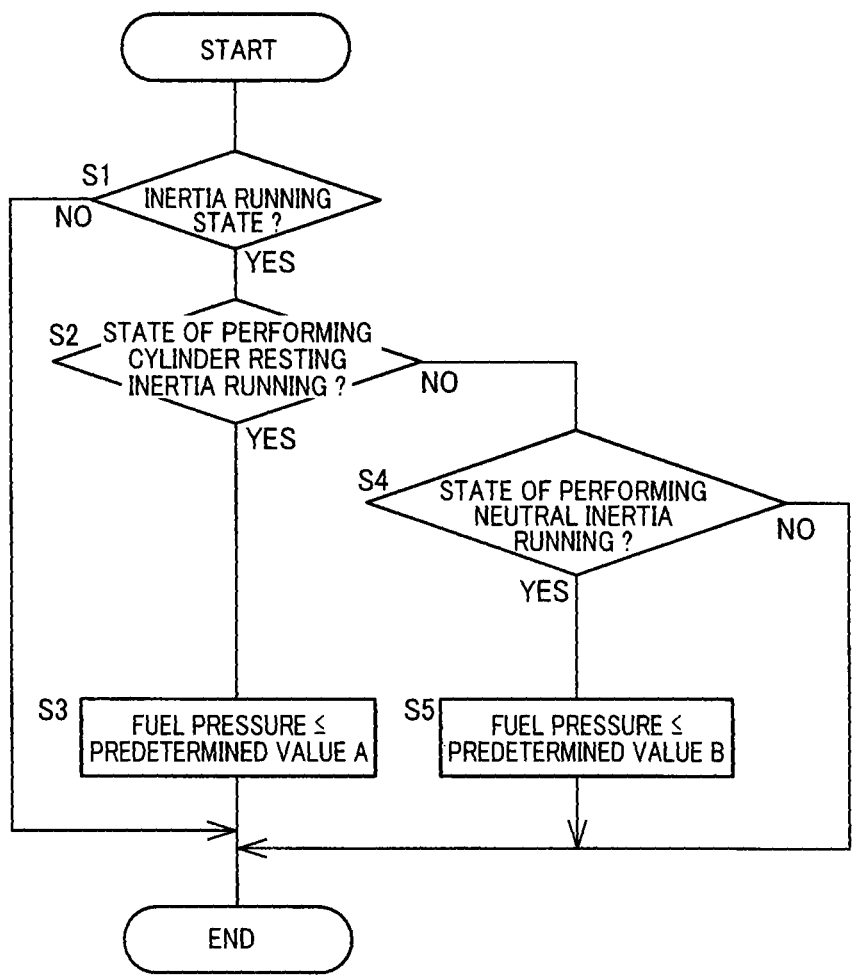
FIG. 3 is a flowchart for explaining a main portion of the control operation of an electronic control device of FIG. 1, i.e., the control operation of satisfying both the fuel consumption improvement during the inertia running mode and a response improvement in reacceleration at the time of return from the inertia running mode to the normal running mode by controlling the fuel pressure to the optimum value during the inertia running mode.

Preferably, a fuel pressure of an engine is a pressure of fuel in a fuel delivery pipe connecting a fuel pump and an injector.

Preferably, a fuel pressure control device is an electrically controllable pressure control electromagnetic valve disposed on the fuel delivery pipe.

Preferably, the engine is put into an idle operation state or a stop state during a neutral inertia running mode.

An example of the present invention will now be described in detail with reference to the drawings. In the following example, the figures are simplified or deformed as needed and portions are not necessarily precisely depicted in terms of dimension ratio, shape, etc.

Example

FIG. 1 is a schematic configuration diagram including a schematic of a vehicle drive device 10 making up a vehicle to which the present invention is preferably applied along with a main portion of a control system. The vehicle drive device 10 includes as a drive force source an engine 12 with a plurality of cylinders 11 that is an internal combustion engine such as a gasoline engine generating power from combustion of fuel, and the output of the engine 12 is transmitted from an automatic transmission 16 via a differential gear device 18 to left and right wheels 20. A damper device and a power transmission device such as a torque converter are disposed between the engine 12 and the automatic transmission 16, and a motor generator acting as a drive force source can also be disposed therebetween.

The engine 12 is of a cylinder direct fuel injection type directly injecting highly pressurized fuel into a combustion chamber and the fuel is directly injected from an injector 22 (a fuel injection device) disposed on each of the cylinders 11 into the combustion chamber. The injector 22 is connected to a fuel tank 24 via a fuel pump 26 and a fuel delivery pipe 28, and the fuel stored in the fuel tank 24 is pressurized and fed by the fuel pump 26 so that the fuel is transferred to the injector 22. The fuel delivery pipe 28 includes a fuel pressure sensor 30 detecting a fuel pressure Pcom of the fuel in the fuel pipe and a pressure control electromagnetic valve 32 electrically controlling the fuel pressure Pcom. The injector 22 can stop fuel supply (perform a fuel cut F/C) at the time of accelerator-off when an accelerator opening degree Acc is zero even during running of the vehicle. The fuel pump 26 is operatively coupled to a crankshaft of the engine 12 and is driven by rotation of the crankshaft.

The engine 12 includes various pieces of equipment necessary for output control of the engine 12, such as an electronic throttle valve. The electronic throttle valve controls an intake air amount and is basically controlled depending on an operation amount of an accelerator pedal (accelerator opening degree) Acc corresponding to an output request amount of a driver. The engine 12 further includes a cylinder resting device 36 resting intake/exhaust valves in a part or all of the cylinders 11. The cylinder resting device 36 can stop the intake/exhaust valves of a part or all of the multiple cylinders 11, for example, eight cylinders and, for example, all the intake/exhaust valves are stopped in a closed valve state. As a result, since a pumping loss is reduced when the engine 12 is driven to rotate in the fuel cut state, an engine brake is reduced and a running distance in an inertia running mode can be extended. Pistons may be separated via a clutch etc. from the crankshaft and stopped instead of stopping the intake/exhaust valves. The cylinder resting device 36 is a known technique and, therefore, specific structure and operation thereof will not be described.

The automatic transmission 16 is a stepped automatic transmission of a planetary gear type etc., having a plurality of gear stages with different gear ratios γ established depending on engaged/released states of a plurality of hydraulic friction engagement devices (clutches and brakes) and is subjected to shift control by electromagnetic hydraulic control valves, switching valves, etc. disposed in a hydraulic control device 34. A clutch C1 acts as an input clutch of the automatic transmission 16 and is also subjected to engagement/release control by the hydraulic control device 34. The clutch C1 corresponds to a connecting/disconnecting device (clutch) connecting and disconnecting a power transmission path between the engine 12 and the wheels 20 i.e., connecting/disconnecting the power transmission path. The automatic transmission 16 may be implemented by using a continuously variable transmission of a belt type etc., instead of a stepped transmission.

The vehicle drive device 10 configured as described above includes an electronic control device 50 (the running control device in the present invention). The electronic control device 50 includes a so-called microcomputer having a CPU, a ROM, a RAM, an I/O interface, etc., to execute signal processes in accordance with a program stored in advance in the ROM, while utilizing a temporary storage function of the RAM. The electronic control device 50 is supplied with a signal indicative of the fuel pressure Pcom of the fuel from the fuel pressure sensor 30, a signal indicative of a brake operation force Brk from a brake operation amount sensor 60, a signal indicative of the accelerator opening degree Acc from an accelerator opening degree sensor 62, a signal indicative of a rotation speed (an engine rotation speed) Ne of the engine 12 from an engine rotation speed sensor 64, a signal indicative of a rotation speed Nout (an output shaft rotation speed Nout) of an output shaft of the automatic transmission 16 corresponding to a vehicle speed V from a vehicle speed sensor 66, a signal indicative of an engine water temperature Tw from an engine water temperature sensor 68, a signal indicative of an engine oil temperature Toil from an engine oil temperature sensor 70, a signal indicative of a remaining amount SOC of a battery from a battery sensor 72, etc. Other various pieces of information necessary for various controls are also supplied.

The electronic control device 50 functionally includes a normal running means 78, a neutral inertia running means 80, a cylinder resting inertia running means 82, a running state determining means 84, and a fuel pressure control means 86. The normal running means 78, the neutral inertia running means 80, and the cylinder resting inertia running means 82 are for the purpose of performing respective inertia running modes depicted in FIG. 2.

The normal running means 78 transmits the drive force of the engine 12 to the wheels 20 for running. In particular, as described in a running mode correspondence table of FIG. 2, the engine 12 is supplied with fuel and rotationally driven during the normal running mode (hereinafter also referred as "normal running") and the clutch C1 connecting/disconnecting the power transmission path between the engine 12 and the wheels 20 is put into an engaged state. Therefore, torque of the engine 12 is transmitted via the clutch C1 etc. to the wheels 20.

The neutral inertia running means 80 performs the neutral inertia running mode (hereinafter also referred as "neutral inertia running") in a running state in which an inertia running mode can be executed, the accelerator opening degree Acc is equal to or less than a predetermined value while the vehicle speed V is equal to or greater than a predetermined value. In the neutral inertia running mode, as described in the correspondence table of FIG. 2, the inertia running mode is performed by releasing the clutch C1 to separate the engine 12 from the wheels 20 while the engine 12 is supplied with fuel and operated in an idle operation state (an idling state). In this case, since the engine brake force becomes smaller than that of the conventional engine brake running mode (hereinafter also referred as "engine brake running") and the release of the clutch C1 results in the engine brake force of substantially zero, a reduction in running resistance extends the running distance in the inertia running mode. Although fuel is consumed by operating the engine 12 in the idle operation state, since the distance of the inertia running mode becomes longer as compared to the conventional engine brake running mode, a frequency of reacceleration is reduced and overall fuel consumption is improved. Although the engine 12 is put in the idle operation during the neutral inertia running mode in the example, the fuel supply to the engine 12 may be stopped to stop the rotation of the engine 12. Therefore, the neutral inertia running mode of the present invention includes not only the form of putting the engine 12 into the idle operation but also the form of stopping the fuel supply to the engine 12 to stop the rotation of the engine 12.

The cylinder resting inertia running means 82 performs the cylinder resting inertia running mode (hereinafter also referred as "cylinder resting inertia running") in the running state in which the inertia running mode can be executed. In the cylinder resting inertia running mode, as described in the correspondence table of FIG. 2, while the engaged state of the clutch C1 is maintained to couple the engine 12 and the wheels 20, the fuel supply to the engine 12 is stopped (the fuel cut F/C is performed) and the cylinder resting device 36 stops the intake/exhaust valves in at least a part (e.g., half) of the multiple cylinders all at the positions where the valves are in the closed valve state. In this case, since the intake/exhaust valves are stopped in a part of the cylinders 11 in the closed valve state although the crankshaft is driven to rotate depending on the vehicle speed V and the gear stage of the automatic transmission 16, a loss due to a pumping action (a pumping loss) becomes smaller as compared to the case of opening/closing of the intake/exhaust valves in synchronization with the crankshaft, and the engine brake force is reduced as compared to the engine brake running mode. As a result, the running distance in the inertia running mode is extended and the fuel consumption is improved. Therefore, although the engine brake force is larger as compared to the neutral inertia running mode and the running distance in the inertia running mode becomes relatively short, since the engine 12 is subjected to the fuel cut and simply driven to rotate, the efficiency of fuel consumption is on the same level with, or equal to or greater than, the neutral inertia running mode.

As described above, the neutral inertia running mode and the cylinder resting inertia running mode are selectively performed in the inertia running state of the vehicle drive device 10. The running modes are appropriately switched, for example, in accordance with a preset inertia running mode map during the inertia running mode or by a running mode selection switch disposed on a driver's seat and switchable by a driver. It is assumed that the switching to the conventional engine brake running mode (fuel-cut inertia running mode) can also be performed if a large engine brake force is required.

The running state determining means 84 determines whether the running state of the vehicle is the inertia running mode and, if the running state is the inertia running mode, determines which of the inertia running modes the inertia running is performed in. The inertia running mode is determined based on whether the accelerator opening degree Acc is equal to or less than a predetermined value setting the value to near zero and the vehicle speed V is equal to or greater than a predetermined value, for example. The running mode during the inertia running can be determined based on the operation state of the engine 12 and the engaged state of the clutch C1, for example. The running mode can also be determined by detecting a running mode command signal output from the electronic control device 50.

The fuel pressure control means 86 adjusts the fuel pressure Pcom of the fuel supplied to the injector 22. The fuel pressure control means 86 controls the pressure control electromagnetic valve 32 disposed on the fuel delivery pipe 28 and capable of electrically adjusting the fuel pressure Pcom, thereby appropriately adjusting the fuel pressure Pcom depending on a running state of the vehicle.

Although the vehicle drive device 10 can perform the neutral inertia running mode and the cylinder resting inertia running mode, if the fuel pressure Pcom of the engine 12 is low during the inertia running mode, engine startability deteriorates at the time of switching to the normal running mode. Although the engine startability is improved by increasing the fuel pressure Pcom, the cylinder resting inertia running mode therefore causes the following problem. Since the clutch C1 is engaged in the case of the cylinder resting inertia running mode, the engine 12 is put into a motoring state by a driven torque transmitted in the direction from the wheels 20. This causes the crankshaft to rotate and, therefore, the fuel pump 26 of the engine 12 is also driven. While the fuel pressure Pcom is high, a workload of the fuel pump 26 becomes larger and the resistance of the inertia running mode increases.

Therefore, the inertia running distance is shortened and the fuel consumption improving effect from the inertia running mode is reduced.

On the other hand, while the fuel pressure Pcom is low, a workload of the fuel pump 26 becomes smaller and the inertia running distance becomes longer; however, in the case of the neutral inertia running mode, the engine startability significantly deteriorates. Since the clutch C1 is released in the neutral inertia running mode, the fuel pressure Pcom of the engine 12 has a smaller effect on the inertia running. However, the clutch C1 must be engaged at the time of return from the neutral inertia running mode to the normal running mode, and rotation speeds of rotating elements of the clutch C1 must be synchronized or brought close a predetermined value or less so as to suppress a shock at the time of engagement. In other words, the engine rotation speed Ne must be increased to a synchronous rotation speed set based on the vehicle speed V, the gear ratio γ of the automatic transmission 16, etc. In this regard, since the engine rotation speed Ne is an idle rotation speed Nidle, which is a relatively low rotation speed, in the neutral inertia running mode, a time is relatively required for increasing the engine rotation speed Ne to the synchronous rotation speed, resulting in a problem of deterioration in response at the time of return from the inertia running mode for reacceleration.

Therefore, the fuel pressure control means 86 changes the fuel pressure Pcom during the inertia running mode depending on a type of the inertia running mode. Specifically, the fuel pressure control means 86 controls the fuel pressure Pcom during the neutral inertia running mode to a value higher than the fuel pressure Pcom during the cylinder resting inertia running mode. As a result of this control, the fuel pressure Pcom is controlled to a relatively low pressure during the cylinder resting inertia running mode. Although the motoring of the engine 12 occurs due to the driven torque from the wheels 20 and the fuel pump 26 is also driven during the cylinder resting inertia running mode, since the fuel pressure Pcom is controlled to a relatively low pressure, the workload of the fuel pump 26 becomes smaller and the inertia running distance becomes longer. Therefore, the fuel consumption improving effect from the inertia running mode increases. Considering the case of switching to the normal running mode, since the engine 12 is put into the motoring state by engaging the clutch C1 in the cylinder resting inertia running mode, the engine rotation speed Ne is maintained at a relatively high rotation speed even in the inertia running mode. Therefore, the engine 12 can promptly be started even though the fuel pressure Pcom is low, and the response deterioration at the time of reacceleration is prevented.

The fuel pressure Pcom is maintained at a relatively high value during the neutral inertia running mode. The engine rotation speed Ne is maintained at the idle rotation speed Nidle, which is a relatively low rotation speed, during the neutral inertia running mode. Although the engine rotation speed Ne must be increased to synchronize the clutch C1 at the time of return to the normal running mode from this state, since the fuel pressure Pcom is maintained at a high value, the engine rotation speed Ne can promptly be increased to complete the synchronization. As a result, the time until engagement of the clutch C1 can be shortened and the response deterioration in reacceleration is prevented.

For controlling the fuel pressure Pcom during the inertia running mode, the fuel pressure control means 86 stores a predetermined value B that is an upper limit value of the fuel pressure Pcom during the neutral inertia running mode and a predetermined value A that is an upper limit value of the fuel pressure Pcom during the cylinder resting inertia running mode. The predetermined value B is set to a value larger than the predetermined value A (the predetermined value B>the predetermined value A). The fuel pressure control means 86 controls the fuel pressure Pcom to a value equal to or less than the predetermined value B (preferably within a range of the predetermined value A to the predetermined value B) during the neutral inertia running mode and controls the fuel pressure Pcom to a value equal to or less than the predetermined value A during the cylinder resting inertia running mode. For example, when detecting that the fuel pressure Pcom is higher than the predetermined value A during the cylinder resting inertia running mode, the fuel pressure control means 86 controls the pressure control electromagnetic valve 32 to reduce the fuel pressure Pcom to the predetermined value A or less. If the fuel pressure Pcom is equal to or less than the predetermined value A when the neutral inertia running mode is started, it is preferable that the fuel pressure Pcom is made equal to or greater than the predetermined value A. In such a case, the fuel pressure control means 86 increases the fuel pressure Pcom until the pressure is set to a value equal to or greater than the predetermined value A and equal to or less than the predetermined value B. Since the engine 12 is driven at the idle rotation speed Nidle in the neutral inertia running mode, the fuel pump 26 is driven so that the pressure can be increased. The predetermined value A and the predetermined value B are empirically obtained values and set to values at which the fuel consumption improving effect during the inertia running mode is favorably acquired while the response in reacceleration also becomes favorable at the time of return from the inertia running mode to the normal running mode. The predetermined value A and the predetermined value B may not necessarily be constant values and may vary depending on the engine water temperature Tw, for example.

FIG. 3 is a flowchart for explaining a main portion of the control operation of the electronic control device 50, i.e., the control operation of satisfying both a fuel consumption effect improvement during the inertia running mode and a response improvement in reacceleration at the time of return from the inertia running mode to the normal running mode by controlling the fuel pressure to the optimum value during the inertia running mode, and is repeatedly executed with an extremely short cycle time, for example, on the order of a few msec to a few tens of msec.

First, at step S1 (hereinafter, step will be omitted) corresponding to the running state determining means 84, it is determined whether the vehicle is in an inertia running state. If S1 is negative, this routine is terminated. If S1 is affirmative, at S2 corresponding to the running state determining means 84, it is determined whether the inertia running mode is the cylinder resting inertia running mode. If S2 is affirmative, it is determined that the inertia running mode is the cylinder resting inertia running mode and, at S3 corresponding to the fuel pressure control means 86, the fuel pressure Pcom is controlled to a value equal to or less than the predetermined value A. Since the predetermined value A is set to a value of a relatively low pressure, the workload of the fuel pump 26 becomes smaller when the fuel pump 26 is driven, and the inertia running distance becomes longer. Therefore, the fuel consumption is improved. Since the engine rotation speed Ne during the cylinder resting inertia running mode is relatively high, a return to the normal running mode can promptly be made even though the fuel pressure Pcom is low.

If S2 is negative, at S4 corresponding to the running state determining means 84, it is determined whether the inertia running mode is the neutral inertia running mode. If S4 is negative, this routine is terminated. If S4 is affirmative, at S5 corresponding to the fuel pressure control means 86, the fuel pressure Pcom is controlled to a value equal to or greater than the predetermined value A and equal to or less than the predetermined value B. Therefore, the fuel pressure Pcom is a relatively high pressure and, at the time of return to the normal running mode, the engine rotation speed Ne can promptly be increased to engage the clutch C1. Since the clutch C1 is released during the neutral inertia running mode, the fuel pressure Pcom has no effect and the inertia running distance becomes longer, resulting in an improvement in fuel consumption.

Figure 4:
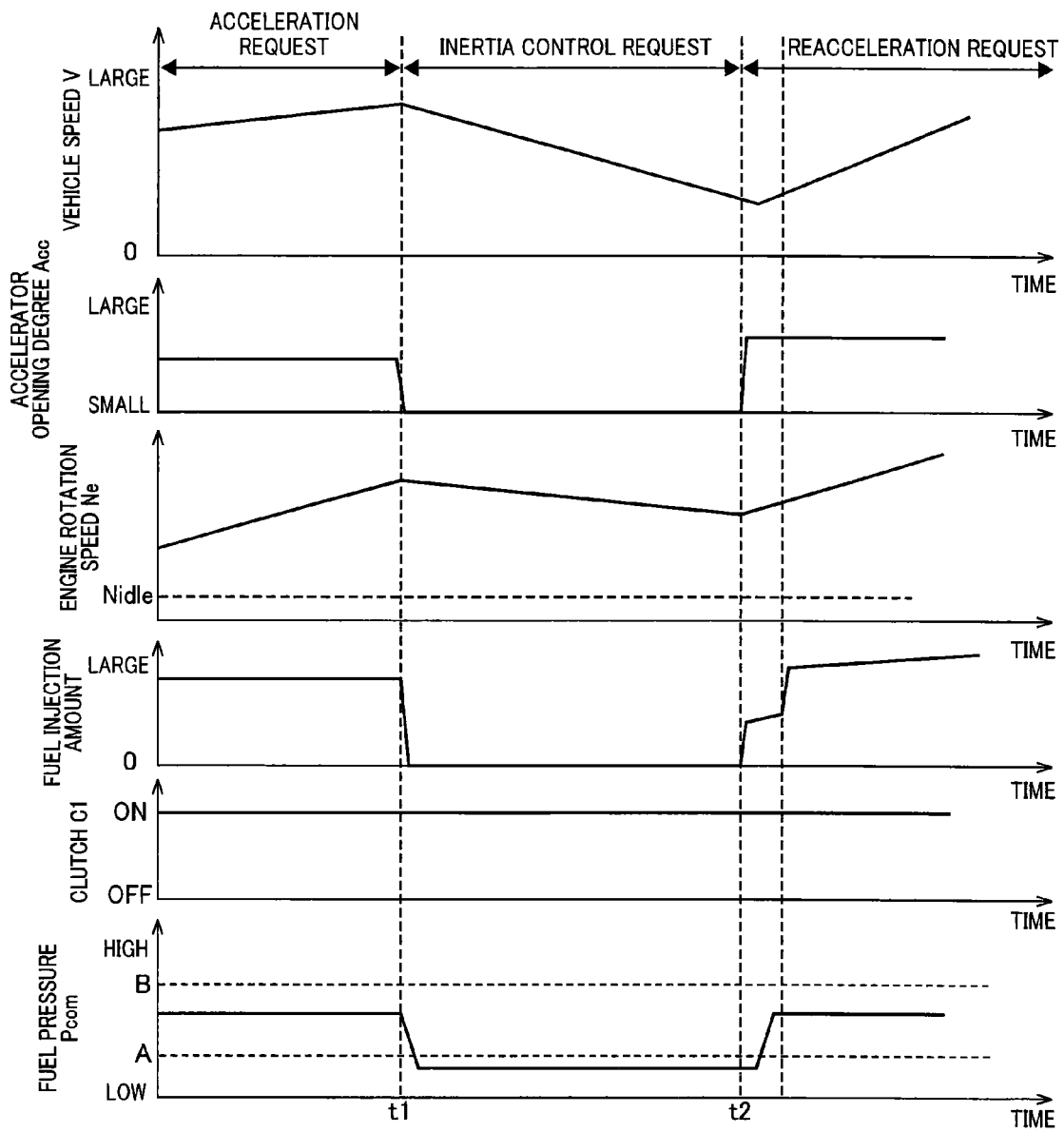
FIG. 4 is a time chart for explaining the vehicle state at the time of switching from the normal running mode to the cylinder resting inertia running mode and then returning from the cylinder resting inertia running mode to the normal running mode.
Figure 5:
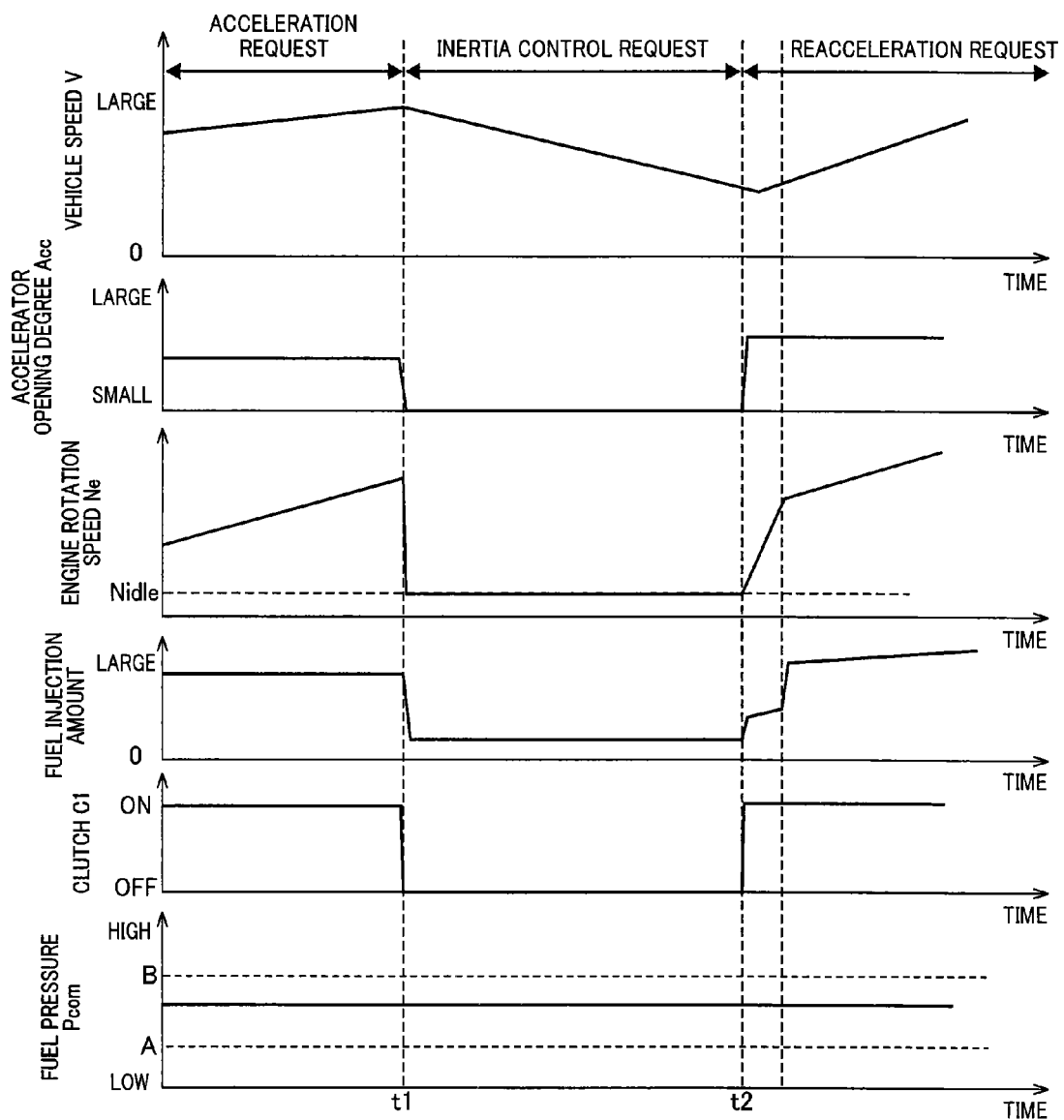
FIG. 5 is a time chart for explaining the vehicle state at the time of switching from the normal running mode to the neutral inertia running mode and then returning from the neutral inertia running mode to the normal running mode.

FIGS. 4 and 5 are time charts of control results from the electronic control device 50. Specifically, FIG. 4 is the time chart at the time of switching from the normal running mode to the cylinder resting inertia running mode and then returning from the cylinder resting inertia running mode to the normal running mode. FIG. 5 is the time chart at the time of switching from the normal running mode to the neutral inertia running mode and then returning from the neutral inertia running mode to the normal running mode. Both in FIGS. 4 and 5, the horizontal axes indicate time and the vertical axes indicate the vehicle speed V, the accelerator opening degree Acc, the engine rotation speed Ne, a fuel injection amount, the engaged state of the clutch C1, and the fuel pressure Pcom, from top to bottom.

In FIG. 4, a running state during the normal running mode is depicted before time t1. In the normal running mode, the engine 12 is driven with the clutch C1 engaged. When depression of an accelerator pedal is released at time t1, the cylinder resting inertia running mode is started. Since the fuel injection is stopped in the cylinder resting inertia running mode (time t1 to time t2), the vehicle speed V is reduced and, since the clutch C1 is engaged, the vehicle speed V gradually decreases while the engine rotation speed Ne gradually decreases. The fuel pressure Pcom is between the predetermined value A and the predetermined value B before time t1 and is controlled to a value equal to or less than the predetermined value A after time t1. Therefore, since the fuel pressure Pcom decreases and a drive work performed at the time of driving of the fuel pump 26 is reduced during the cylinder resting inertia running mode, the inertia running distance is extended and the fuel consumption is improved.

At time t2, the depression of the accelerator pedal results in output of a reacceleration request and a return to the normal running mode is made. Although the fuel injection is resumed to start the engine 12 in this case, the fuel pressure Pcom is in a low pressure state lower than the predetermined value A and, therefore, the engine rotation speed Ne is not rapidly increased. However, since the engagement of the clutch C1 results in the motoring of the engine 12 in the cylinder resting inertia running mode, the engine rotation speed Ne is not rapidly reduced and is maintained at a relatively high rotation speed even at time t2 when the return to the normal running mode is made. Therefore, the reacceleration can promptly be achieved even though the fuel pressure Pcom is low.

FIG. 5 will be described. In FIG. 5, as is the case with FIG. 4, a running state during the normal running mode is depicted before time t1. At time t1, the depression of the accelerator pedal is released and the neutral inertia running mode is started. In the neutral inertia running mode (time t1 to time t2), the clutch C1 is released and the engine 12 is driven at the idle rotation speed Nidle. In this case, the fuel pressure Pcom is maintained at a value equal to or less than the predetermined value B as is the case with time t1. Although the fuel pressure Pcom is maintained in a relatively high state, the release of the clutch C1 reduces the effect thereof and the inertia running distance becomes longer.

At time t2, the depression of the accelerator pedal results in output of a reacceleration request and a return to the normal running mode is made. Although the engine rotation speed Ne is the idle rotation speed Nidle, which is a relatively low rotation speed in this case, the engine rotation speed Ne can promptly be increased since the fuel pressure Pcom is high. Therefore, the clutch C1 can promptly be synchronized and engaged and the response deterioration in reacceleration is prevented.

As described above, according to this example, the fuel pressure Pcom of the engine 12 becomes higher during the neutral inertia running mode as compared to the cylinder resting inertia running mode. Therefore, the fuel injection can performed at the high fuel pressure Pcom and the engine rotation speed Ne can promptly be increased at the time of return from the neutral inertia running mode to the normal running mode. Thus, the clutch C1 connecting/disconnecting the power transmission path between the engine 12 and the wheels 20 can promptly be synchronized and engaged and a favorable response in reacceleration can be obtained. The fuel pressure Pcom of the engine 12 becomes lower during the cylinder resting inertia running mode as compared to during the neutral inertia running mode. Therefore, the workload of the fuel pump 26 during the cylinder resting inertia running mode becomes smaller and the inertia running distance becomes longer so that the fuel consumption improving effect from the inertia running mode can be increased. Since the engine 12 and the wheels 20 are coupled via the clutch C1 in the cylinder resting inertia running mode, the engine rotation speed Ne is maintained high and the reacceleration can promptly be achieved even though the fuel pressure Pcom is low.

Although the examples of the present invention have been described in detail with reference to the drawings, the present invention is also applied in other forms.

For example, although the state of the engine 12 during the neutral inertia running mode is the idle operation state in the example, the state is not limited to the idle operation and may be maintained at a rotation speed enabling the self-sustaining rotation, or the engine 12 may even be stopped.

Although the engine 12 is of a cylinder direct fuel injection type directly injecting fuel into a combustion chamber in the example, a port injection type may be applied that injects fuel to an intake port of each cylinder.

Although the fuel pump 26 is driven in conjunction with the crankshaft in the example, this is not a limitation and the fuel pump may be driven by an electric motor. Alternatively, the fuel pump may be coupled in parallel with the crankshaft and the electric motor, which are used together for driving the fuel pump. If the electric motor is provided, the fuel pump can be driven by using the electric motor so as to maintain the fuel pressure Pcom at a high value when the engine is stopped during the neutral inertia running mode.

Although the intake/exhaust valves of the cylinders 11 rested during the cylinder resting inertia running mode are all closed in the example, this is not necessarily a limitation and, for example, the intake/exhaust valves may be opened without limiting to the form of closing the intake/exhaust valves.

Although the clutch C1 connecting/disconnecting the power transmission path between the engine 12 and the wheels 20 is one of the clutches of the automatic transmission 16 including pluralities of clutches and brakes and switchable to neutral in the example, the clutch C1 is not limited to the automatic transmission 16 and is not particularly limited as long as the clutch connects and disconnects the power transmission path between the engine 12 and the wheels 20. The clutch is not limited to a hydraulic friction engagement device and can be implemented by using various connecting/disconnecting devices such as an electromagnetic clutch, for example.

Although the stepped automatic transmission 16 applied is of a planetary gear type etc., having a plurality of gear stages with different gear ratios γ established depending on engaged/released states of a plurality of hydraulic friction engagement devices (clutches and brakes) in the example, a specific structure of the transmission is not particularly limited to the example. The present invention is applicable to a transmission of a different type including a belt type continuously variable transmission, for example.

In the example, the order of the flowchart is an example and the order may be changed as needed without contradiction. For example, in the flowchart of FIG. 3, step S2 and step S4 may be executed in the reverse order.

Although the pressure control electromagnetic valve 32 is used that acts as a fuel pressure control device adjusting the fuel pressure Pcom in the example, a change can be made as needed, including adjusting the fuel pressure Pcom through control of the fuel pump 26.

The above description is merely an embodiment and the present invention can be implemented in variously modified and improved forms based on the knowledge of those skilled in the art.

NOMENCLATURE OF ELEMENTS

11: cylinders
12: engine
20: wheels
22: injector
26: fuel pump
28: fuel delivery pipe (transfer path of fuel)
32: pressure control electromagnetic valve (fuel pressure control device)
50: electronic control device (running control device)
C1: clutch

The invention claimed is:

1. A running control device of a vehicle including an engine with a plurality of cylinders, a clutch connecting/disconnecting a power transmission path between the engine and wheels, a fuel pump transferring fuel toward an injector, and a fuel pressure control device controlling a fuel pressure in a transfer path of the fuel, the running control device of a vehicle performing
   a neutral inertia running mode performed with the power transmission path between the engine and the wheels disconnected, and
   a cylinder resting inertia running mode performed by resting at least a part of the cylinders of the engine with the power transmission path between the engine and the wheels connected,
   the fuel pressure during the neutral inertia running mode being made higher than the fuel pressure during the cylinder resting inertia running mode.

* * * * *